United States Patent [19]
Ito et al.

[11] Patent Number: 6,150,427
[45] Date of Patent: Nov. 21, 2000

[54] FOAMING PROPYLENE COPOLYMER, AND FOAMED PARTICLES AND FOAMS THEREOF

[75] Inventors: Toshimichi Ito, Ichihara; Yasushi Seta; Ryoichi Tsunori, both of Ichiharashi, all of Japan

[73] Assignee: Idemitsu Petrochemical Co., Ltd., Tokyo, Japan

[21] Appl. No.: 09/147,735

[22] PCT Filed: Jun. 30, 1998

[86] PCT No.: PCT/JP98/02926

§ 371 Date: Feb. 26, 1999

§ 102(e) Date: Feb. 26, 1999

[87] PCT Pub. No.: WO99/01486

PCT Pub. Date: Jan. 14, 1999

[30] Foreign Application Priority Data

Jul. 1, 1997 [JP] Japan ................................. 9-175617

[51] Int. Cl.[7] .................... C08J 9/18; C08J 9/20; C08J 9/22
[52] U.S. Cl. .................. 521/56; 521/57; 521/60; 521/142; 521/143
[58] Field of Search ................ 521/56, 60, 142, 521/143, 57

[56] References Cited

U.S. PATENT DOCUMENTS 5,346,925  9/1994  Sugano et al. ........................ 521/142
5,468,781  11/1995  Sugano et al. .

*Primary Examiner*—Morton Foelak
*Attorney, Agent, or Firm*—Oblon, Spivak, McClelland, Maier & Neustadt, P.C.

[57] ABSTRACT

Provided are a foaming propylene-ethylene random copolymer which is characterized in that (1) its ethylene unit content [x (wt. %)] falls between 0.2 and 10% by weight, (2) its MI falls between 1 and 16 g/10 min, (3) its boiling diethyl ether extraction [E (wt. %)] and x satisfy the relation of a formula (I):

$$E \leq 0.25x + 1.1 \quad (I),$$

(4) its melting point [Tm (° C.)] and x satisfy the relation of a formula (II):

$$Tm \leq 165 - 5x \quad (II),$$

(5) its isotactic triad fraction in the PPP chain moiety as measured through $^{13}C \leq NMR$ is not smaller than 98 mol %, and preferably, (6) the relation between the time of relaxation τ (sec) of the copolymer and MI of the copolymer satisfies a formula (III):

$$\tau \leq 0.80 - 0.42 \times \log MI \quad (III),$$

and also its foaming beads and cellular articles. The copolymer and its foaming beads have improved primary and secondary foamability, and the cellular articles of the copolymer have excellent mechanical properties including rigidity.

16 Claims, No Drawings

FOAMING PROPYLENE COPOLYMER, AND FOAMED PARTICLES AND FOAMS THEREOF

FIELD OF THE INVENTION

The present invention relates to a foaming propylene-based copolymer, its foaming beads and cellular articles. More precisely, it relates to a foaming propylene-based copolymer of an isotactic propylene-ethylene random copolymer having improved primary foamability and secondary foamability and capable of being foamed into cellular articles having good mechanical properties including rigidity, to foaming beads comprising the copolymer, and to cellular articles as produced by foaming the foaming beads.

DESCRIPTION OF THE BACKGROUND

Crystalline polypropylene resin-based cellular articles are, as being characterized in that (1) their buffer capacity is high, (2) their thermal conductivity is low, and their thermal stability is good as their heat-resisting temperature is much higher than that of polyethylene cellular articles, (3) their chemical resistance is good, (4) their machine workability, press workability and vacuum moldability are good, and (5) they are stiff and have high strength, much used, for example, in buffer materials, wrapping materials, bumper core materials, floating materials, heat-insulating materials, etc.

For producing such crystalline polypropylene resin-based cellular articles, in general, preferably employed is a method comprising dispersing resin beads in an aqueous medium containing a dispersant, then adding a physical foaming agent thereto under heat and pressure to thereby introducing the foaming agent into the resin beads, and thereafter releasing the resin beads along with the aqueous medium into an open space at an atmospheric pressure for primary foaming into foaming beads. In that method, the foaming beads thus prepared are heated in a mold under pressure generally with steam for secondary foaming into a cellular article having a desired shape.

In the foaming method of that type, it is desirable from the viewpoint of industrial advantages to attain the primary foaming and the secondary foaming at temperatures as low as possible for preparing foaming beads having a desired expansion ratio and for finally producing high-quality cellular articles having a high expansion ratio but having few voids.

Crystalline propylene-ethylene random copolymers having a larger ethylene unit content will generally have lower rigidity. Therefore, in order to increase their rigidity, the ethylene unit content of the copolymers must be lowered. However, for conventional crystalline propylene-ethylene random copolymers having a lowered ethylene unit content, the heating temperature for the primary and secondary foaming shall be inevitably high, thereby bringing about some problems with the equipment for the foaming process, and the high heating temperature is disadvantageous for industrial-scale production of cellular articles of the copolymers.

SUMMARY OF THE INVENTION

Given that situation, the object of the present invention is to provide a foaming crystalline polypropylene-based resin of which the primary and secondary foamability is good to give high-quality cellular articles having good mechanical properties including rigidity, and which can be subjected to primary and secondary foaming at lower temperatures than conventional crystalline polypropylene-based resins, and also to provide foaming beads of the resin as well as cellular articles formed from them.

DETAILED DESCRIPTION OF THE PREFERRED EMBODIMENTS

We, the present inventors have assiduously studied so as to attain the object noted above, and, as a result, have found that a propylene-ethylene random copolymer having specific physical properties has good primary and secondary foamability to give high-quality cellular articles having good mechanical properties including rigidity. On the basis of this finding, we have completed the present invention.

Specifically, the invention provides a foaming propylene-based copolymer of a propylene-ethylene random copolymer, which is characterized in that (1) its ethylene unit content [x (wt. %)] falls between 0.2 and 10% by weight, (2) its melt index [MI (at 230° C. under a load of 2160 g)] falls between 1 and 16 g/10 min, (3) its boiling diethyl ether extraction [E (wt. %)] and x satisfy the relation of a formula (I):

$$E \leq 0.25x + 1.1 \quad (I),$$

(4) its melting point [Tm (° C.)] as measured through differential scanning calorimetry and x satisfy the relation of a formula (II):

$$Tm \leq 165 - 5x \quad (II),$$

and (5) its isotactic triad fraction in the PPP (propylene-propylene-propylene) chain moiety as measured through $^{13}$C—NMR is not smaller than 98 mol %; and also provides a foaming propylene-based copolymer of a propylene-ethylene random copolymer, which is characterized by (1) to (5) noted above and additionally by (6) the relation between the time of relaxation τ (sec) of the copolymer as obtained through frequency division measurement at a frequency ($\omega_o = 10^0$ rad/sec and MI of the copolymer that satisfies a formula (III):

$$\tau \leq 0.80 - 0.42 \times \log MI \quad (III).$$

The invention further provides foaming beads of the propylene-based copolymer, and also cellular articles as produced by foaming the foaming beads.

BEST MODES OF CARRYING OUT THE INVENTION

The foaming propylene-based copolymer of the invention is a propylene-ethylene random copolymer, and is characterized by their specific physical properties to be mentioned below.

(1) The ethylene unit content [x (wt. %)] of the copolymer must fall between 0.2 and 10% by weight. If the ethylene unit content is smaller than 0.2% by weight, the primary and secondary foamability of the copolymer is poor. If, however, larger than 10% by weight, the rigidity and the heat resistance of the cellular articles of the copolymer are poor. From the viewpoint of the primary and secondary foamability of the copolymer and of the rigidity and the heat resistance of the cellular articles of the copolymer, the preferred range of the ethylene unit content of the copolymer falls between 0.3 and 8.0% by weight. The method for measuring the ethylene unit content of the copolymer will be described hereinafter.

(2) The melt index [MI (at 230° C. under a load of 2160 g)] of the copolymer must fall between 1 and 16 g/10 min. If MI oversteps the defined range, the primary and secondary foamability of the copolymer is poor. MI of the copolymer is measured according to JIS K7210, at a temperature of 230° C. and under a load of 2160 g.

(3) The boiling diethyl ether extraction [E (wt. %)] and x of the copolymer must satisfy the relation of a formula (I):

$$E \leq 0.25x + 1.1 \qquad (I)$$

If the value E is larger than the defined range, the foaming beads and the cellular articles of the copolymer will be disadvantageously sticky.

The method for measuring the boiling diethyl ether extraction of the copolymer will be described hereinafter.

(4) The melting point [Tm (° C.)] as measured through differential scanning calorimetry and x of the copolymer must satisfy the relation of a formula (II):

$$Tm \leq 165 - 5x \qquad (II)$$

Copolymers of which Tm is higher than the defined range require heating at high temperatures for their primary and secondary foaming, and therefore could not attain the object of the invention.

The method for measuring Tm of the copolymer will be mentioned hereinafter.

(5) The isotactic triad fraction in the PPP chain moiety of the copolymer, as measured through $^{13}$C—NMR, must be not smaller than 98 mol %. If the isotactic triad fraction in question is smaller than 98 mol %, the degree of crystallinity of the copolymer is low, and the mechanical properties including rigidity of the cellular articles of the copolymer are bad. If so, therefore, the object of the invention could not be attained. The isotactic triad fraction as referred to herein indicates the proportion of the stereospecific structure in which three side chains of methyl groups are all positioned in the same direction relative to the main chain of carbon-carbon bonds for any three continuous propylene units, and is obtained through $^{13}$C—NMR. The method for obtaining the isotactic triad fraction will be mentioned hereinafter.

One preferred embodiment of the propylene-based copolymer of the invention which is characterized by (1) to (5) noted above is additionally characterized by (6) the relation between the time of relaxation $\tau$ (sec) of the copolymer as obtained through frequency division measurement at a frequency ($\omega = 10^0$ rad/sec and MI of the copolymer that satisfies a formula (III):

$$\tau \leq 0.80 - 0.42 \times \log MI \qquad (III)$$

If the relaxation time, $\tau$ is longer than the defined range, the primary and secondary foamability of the copolymer is poor.

The method for measuring the value $\tau$ will be mentioned hereinafter.

For producing the propylene-based copolymer of the invention, or that is, the propylene-ethylene random copolymer that satisfies the requirements noted above, various methods are employable with no specific limitation. For example, propylene and ethylene may be random-copolymerized in the presence of a catalyst system comprising (a) a solid catalyst component consisting essentially of magnesium, titanium and a halogen, (b) a catalyst component of an organic metal compound such as an organic aluminium compound, and (c) a catalyst component of an electron donor compound such as an organic silicon compound.

Preferred carriers for the solid catalyst component (a) can be obtained by reacting a metal magnesium, an alcohol, and a halogen and/or a halogen-containing compound. The metal magnesium maybe in any form of granular, ribbon-like, or powdery ones. Preferably, the metal magnesium is not coated with a coating layer of magnesium oxide or the like.

The alcohol is preferably a lower alcohol having from 1 to 6 carbon atoms. Especially preferred is ethanol, as giving good carriers that greatly promote the expression of the catalyst capabilities.

The halogen is preferably chlorine, bromine or iodine. Of those, especially preferred is iodine. As the halogen-containing compound, preferably used is $MgCl_2$ or $MgI_2$.

The amount of the alcohol to be used is preferably from 2 to 100 mols, more preferably from 5 to 50 mols, per mol of the metal magnesium.

The amount of the halogen or halogen-containing compound to be used maybe generally 0.0001 gram-atoms or more, preferably 0.0005 gram-atoms or more, especially preferably 0.001 gram-atoms or more, in terms of the amount of the halogen atom itself or of the amount of the halogen atom in the halogen-containing compound, relative to 1 gram-atom of the metal magnesium. One or more halogens or halogen-containing compounds can be used either singly or as combined.

Those metal magnesium, alcohol, and halogen and/or halogen-containing compound may be reacted, for example, under reflux (at about 79° C. where ethanol is used) until hydrogen gas is no more formed (generally for a period of from 20 to 30 hours). This reaction is preferably effected in an inert gas (e.g., nitrogen gas or argon gas) atmosphere.

Where the carrier thus produced through the reaction is used in producing the solid catalyst component, it may be dried, or, after having been filtered out, it may be washed with an inert solvent such as heptane.

The carrier thus obtained is nearly granular, while having a narrow grain size distribution to give a sharp peak. In addition, the variation in the shape of each grain constituting the carrier is extremely possible. Preferably, the sphericity (S) of each grain to be represented by the following (IV) is less than 1.60, more preferably less than 1.40, and the grain size distribution index (P) to be represented by the following formula (V) is less than 5.0, more preferably less than 4.0.

$$S = (E1/E2)^2 \qquad (IV)$$

wherein E1 indicates the length of the projected border line of each grain; and E2 indicates the circumference of the circle of which the area is the same as the projected area of each grain.

$$P = D90/D10 \qquad (V)$$

wherein D90 indicates a grain size corresponding to the weight cumulative fraction of 90%. In other words, D90 means that the weight sum of the grains having a grain size smaller than the grain size represented by D90 is 90% of the total weight sum of all grains. The same shall apply also to D10.

The solid catalyst component (a) is produced by contacting the carrier with at least a titanium compound.

The titanium compound may be one represented by a general formula (VI):

$$TiX^1_n(OR^1)_{4-n} \quad (VI)$$

wherein $X^1$ represents a halogen atom, especially preferably a chlorine atom; $R^1$ represents a hydrocarbon group having from 1 to 10 carbon atoms, especially preferably a linear or branched alkyl group, and plural $R^1$'s, if any, may be the same or different; and n is an integer of from 0 to 4.

Concretely, the titanium compound includes $Ti(O-i-C_3H_7)_4$, $Ti(O-C_4H_9)_4$, $TiCl(O-C_2H_5)_3$, $TiCl(O-i-C_3H_7)_3$, $TiCl(O-C_4H_9)_3$, $TiCl_2(O-C_4H_9)_2$, $TiCl_2(O-i-C_3H_7)_2$, $TiCl_4$, etc. Of those, especially preferred is $TiCl_4$. These titanium compounds may be used either singly or as combined.

As the case may be, the solid catalyst component may be produced by further contacting the carrier with an electron donor compound along with the titanium compound. The electron donor compound is preferably an aromatic dicarboxylate, especially preferably di-n-butyl phthalate.

While the carrier is contacted with the titanium compound and optionally the electron donor compound, it is desirable that the carrier is further contacted with a halogen-containing silicon compound such as silicon tetrachloride.

The solid catalyst component can be produced in any known manner. For example, the carrier and optionally the electron donor compound and the halogen-containing silicon compound are put into an inert hydrocarbon solvent such as pentane, hexane, heptane or octane, to which is added a titanium compound with stirring to prepare the solid catalyst component. For this, the electron donor compound is used generally in an amount of from 0.01 to 10 mols, preferably from 0.05 to 5 mols, per mol of the carrier in terms of the magnesium atom; and the titanium compound is used generally in an amount of from 1 to 50 mols, preferably from 2 to 20 mols, per mol of the carrier in terms of the magnesium atom.

The reaction temperature and the reaction time generally fall between 0 and 200° C. and between 5 minutes and 10 hours or so, respectively, but preferably between 30 and 150° C. and between 30 minutes and 5 hours or so, respectively.

After the reaction, it is preferred that the solid catalyst component formed is washed with an inert hydrocarbon (e.g., n-hexane, n-heptane).

As the organic metal compound for the catalyst component (b), preferably used are organic aluminium compounds. For this, widely used are organic aluminium compounds of a general formula (VII):

$$AlR^2_m X^2_{3-m} \quad (VII)$$

wherein $R^2$ represents an alkyl group having from 1 to 10 carbon atoms, a cycloalkyl group, or an aryl group; $X^2$ represents a halogen atom and is preferably a chlorine or bromine atom; and m is an integer of from 1 to 3.

Concretely, the compounds include trialkyl aluminium compounds such as trimethyl aluminium, triethyl aluminium, triisobutyl aluminium; and also diethylaluminium monochloride, diisobutylaluminium monochloride, diethylaluminium monoethoxide, ethylaluminium sesquichloride, etc. One or more of those compounds can be used either singly or as combined.

The electron donor compound that is applied to the polymerization system as the catalyst component (c) is preferably an organic silicon compound. Especially preferred is dicyclopentyldimethoxysilane.

The solid catalyst component is used in the intended polymerization, preferably after having been pre-treated. To pre-treat it, preferably, the solid catalyst component is put into an inert hydrocarbon solvent such as pentane, hexane, heptane or octane, along with an organic metal compound and an electron donor compound such as those mentioned hereinabove, and those are reacted with stirring them and with adding propylene thereto. The organic metal compound is used in an amount of generally from 0.01 to 10 mols, preferably from 0.05 to 5 mols, per mol of the titanium atom in the solid catalyst component; and the electron donor compound is used in an amount of generally from 0.01 to 20 mols, preferably from 0.1 to 5 mols, per mol of the titanium atom in the solid catalyst. Propylene is added to the catalyst system at a propylene partial pressure higher than an atmospheric pressure, with which the solid catalyst is pre-treated preferably at from 0 to 100° C. or so for from 0.1 to 24 hours or so. After the reaction, preferably, the pre-treated catalyst is washed with an inert hydrocarbon (e.g., n-hexane or n-heptane).

The polymerization conditions for producing the copolymer of the invention are not specifically defined, and may be any ordinary ones for known methods. For example, propylene and ethylene may be copolymerized under propylene and ethylene partial pressures higher than atmospheric pressure, generally at a temperature falling between −80 and 150° C. Preferably, they are copolymerized under propylene and ethylene partial pressures falling between atmospheric pressure and 40 kg/cm²G, at a temperature falling between 20 and 150° C. In the copolymerization, the organic metal compound is used generally in an amount of from 0.1 to 400 mols, preferably from 1 to 200 mols, per mol of the titanium atom in the solid catalyst component; and the electron donor compound is used generally in an amount of from 0.1 to 100 mols, preferably from 1 to 50 mols, per mol of the titanium atom in the solid catalyst.

The amount of ethylene to be fed and that of hydrogen to be fed are so controlled that the copolymer produced may have the intended ethylene unit content and molecular weight. The ethylene unit content of the copolymer is influenced by not only the ethylene concentration in the polymerization reactor but also the hydrogen concentration therein. The molecular weight of the copolymer is influenced by not only the hydrogen concentration but also the ethylene concentration.

The foaming propylene-based copolymer of the invention comprises the propylene-ethylene random copolymer produced in the manner mentioned above. Comparing a stereospecific (isotactic) propylene polymer having ethylene units introduced thereinto with a non-stereospecific one, there is found no significant difference between them in the degree of crystallinity, but the melting point of the former is much more lowered than that of the latter. On the basis of this finding, we, the present inventors have succeeded in obtaining the propylene-based random copolymer of the invention which has an increased degree of crystallinity and has a lowered melting point, by increasing the degree of stereospecificity in the propylene unit chain moiety of the copolymer and random-copolymerizing the moiety with ethylene. Since the copolymerizability is good, the melting point of the copolymer can be effectively lowered even when a small amount of the comonomer, ethylene is copolymerized. As a result, the primary and secondary foamability of the foaming propylene-based copolymer of the invention is good.

The foaming beads of the invention are described hereinunder.

The foaming beads of the invention can be produced from the foaming propylene-based copolymer of the invention as prepared in the manner mentioned above. If desired, any known additives including a nucleating agent for foams, and even any other known thermoplastic resins may be added to the foaming propylene-based copolymer, without interfering with the object of the invention, to prepare a resin composition, and the composition may be used for producing the foaming beads.

The nucleating agent includes, for example, talc, silica, calcium silicate, calcium carbonate, aluminium oxide, titanium oxide, zinc oxide, diatomaceous earth, clay, sodium hydrogencarbonate, barium sulfate, bentonite, stearates, etc. These may be used either singly or as combined. The amount of the agent to be added may be generally from 0.01 to 3.0 parts by weight relative to 100 parts by weight of the foaming propylene-based copolymer.

The other known additives include, for example, a heat stabilizer, an antioxidant, a hindered amine-type photostabilizer, an ultraviolet absorbent, a reinforcing agent such as an organic filler and an inorganic filler, a lubricant, an antistatic agent, a flame retardant, a colorant, a mold-releasing agent, etc.

In the invention, the foaming propylene-based copolymer and optional additives are kneaded in melt to prepare a resin composition, which is then pelletized into resin beads. Regarding their size, advantageously, the resin beads may have a diameter of from 0.25 to 2 mm or so, and a ratio, L/D of falling between 1 and 3 or so.

The method for producing the resin beads is not specifically defined, and the resin beads may be produced in any known manner. For example, the resin composition is kneaded in melt in an extruder, and is extruded out through the nozzle fitted at the top of the extruder and having small orifices, into resin strands, and these are cut with a cutter equipped with a collector, into resin beads having the size noted above; or the resin composition is kneaded in a mixing machine such as a kneader or mixer, and then ground in a grinder into the intended resin beads.

Next, the thus-formed resin beads are subjected to primary foaming to prepare foaming beads. The method for preparing the foaming beads is not specifically defined, and the foaming beads may be prepared in any known manner. In the present invention, however, preferably employed is dispersion foaming. The dispersion foaming method generally comprises putting the resin beads into a pressure container capable of being closed and opened, along with a dispersion medium and a dispersant, then adding a physical foaming agent thereto, heating them with stirring by means of an external or internal heater up to a temperature at which the foaming agent can effectively penetrate into the resin beads in the container, and keeping them heated so therein for a predetermined period of time. Next, the pressure container is opened to thereby lower the pressure therein, and the mixture is discharged out of the container. Thus are obtained the intended foaming beads.

As the dispersion medium, preferred is an aqueous medium such as water. The dispersant is used in the method for preventing the resin beads from fusing together in the container, and this is an inorganic or organic substance having a high melting point and substantially not soluble in the dispersion medium used. Specific examples of the dispersant include aluminium oxide, calcium carbonate, magnesium carbonate, zinc carbonate, basic calcium tertiary phosphate, kaolin, mica, talc, etc. Of those, preferred are aluminium oxide, basic calcium tertiary phosphate, and kaolin. These dispersants may be used either singly or as combined. The amount of the dispersant to be used may be generally from 0.01 to 3.0 parts by weight relative to 100 parts by weight of the resin beads. If desired, a surfactant such as sodium dodecylbenzenesulfonate or sodium oleate may be added to the primary foaming system.

The physical foaming agent includes inert gases, saturated aliphatic hydrocarbons, saturated alicyclic hydrocarbons, aromatic hydrocarbons, halogenated hydrocarbons, ethers, ketones, etc. As specific examples of those physical foaming agents, mentioned are methane, ethane, propane, normal butane, isobutane, normal pentane, isopentane, neopentane, cyclopentane, normal hexane, 2-methylpentane, 3-methylpentane, 2,2-dimethylbutane, 2,3-dimethylbutane, methylcyclopropane, 1,1-dimethylcyclopropane, cyclohexane, methylcyclopentane, ethylcyclobutane, 1,1,2-trimethylcyclopropane, benzene, methyl chloride, monochlorodifluoroethane, dichlorodifluoromethane, dimethyl ether, 2-ethoxyethanol, acetone, methyl ethyl ketone, acetylacetone, LPG, carbon dioxide, nitrogen, air, etc. These may be used either singly or as combined. The amount of the foaming agent to be used may fall generally between 3 and 60 parts by weight relative to 100 parts by weight of the resin beads.

For the primary foaming, in general, the heating temperature may fall between 125 and 160° C., and the pressure may fall between 20 and 50 kg/cm$^2$G or so. The pressure in the low-pressure zone into which released is the resin mixture having been processed in a pressure container may be lower than atmospheric pressure. In general, however, the resin mixture is released into an atmospheric pressure zone, as being inexpensive.

The foaming beads thus prepared may have a mean foam size of generally from 10 to 500 $\mu$m or so, and a bulk density of generally from 0.009 to 0.3 g/cm$^3$ or so, though varying depending on the condition for primary foaming.

The cellular articles of the invention may be produced by charging the foaming beads into a mold, introducing a heating medium into the mold, and subjecting the foaming beads to secondary foaming in the mold in which the beads are fused together under heat. In this process, in general, steam of from 2 to 4 kg/cm$^2$G or so is used as the heating medium.

The cellular articles thus produced have few voids in their surface and inside, and have good quality. The expansion ratio for them generally falls between 3 and 100 times or so.

If desired, the cellular articles of the invention may be laminated with any of non-foaming thermoplastic resin, fiber-reinforced thermoplastic resins and fiber-reinforced thermosetting resins, and even with various metals, in any ordinary method.

The invention is described in more detail with reference to the following Examples, which, however, are not intended to restrict the scope of the invention.

The physical properties of the propylene-based copolymer of the invention are measured according to the methods mentioned below.

<Physical Properties of Propylene-Based Copolymer>
(1) Ethylene Unit Content [x (% by weight)]

A copolymer sample was formed into a sheet having a thickness of 300 $\mu$m, under the condition mentioned below, and the absorbance of the sheet at 718 cm$^{-1}$ and 733 cm$^{-1}$ was measured with Nippon Spectrometry's FT/IR5300, from which was obtained the ethylene unit content [x (% by weight)] of the sample.

$x_1 = 0.599 \times (A_{733}/d \cdot L) - 0.161 \times (A_{718}/d \cdot L)$ $x_2 = 0.599 \times (A_{718}/d \cdot L) - 0.161 \times (A_{733}/d \cdot L)$
$x = 0.809 \times (x_1 + x_2)$ $A_{718}$: absorbance at 718 cm$^{-1}$ of the sample
$A_{733}$: absorbance at 733 cm$^{-1}$ of the sample
$d = 0.9$
L: thickness of the sample Sheeting Condition:
  Press temperature: 220° C.
  Hot and cold pressure: 50 kg/cm$^2$G
  Period of pre-heating: 5 min
  Period of hot pressure: 5 min
  Period of cold pressure: 3 min IR Condition:
  Number of integration: 20
  Resolution: 4 cm$^{-1}$ (2) Melt Index [MI] (g/10 min):

The melt index of the copolymer was measured at a temperature of 230° C. and under a load of 2160 g, according to JIS K7210.

(3) Boiling Diethyl Ether Extraction [E (% by weight)]:

3 g of pellets of a copolymer sample that had been ground to pass through a 1 mmφ mesh were put into a cylindrical filter, while 160 ml of an extraction solvent of diethyl ether was put into a flat bottom flask. The pellets were extracted with the solvent, using a Soxhlet's extractor, at a reflux frequency of 1 time/5 min or so for 10 hours. After the extraction, diethyl ether was evaporated away, using an evaporator, and the resulting residue was dried in a vacuum drier to have a constant weight, from which was obtained the boiling diethyl ether extraction of the sample.

(4) Melting Point of Copolymer as Measured with Differential Scanning Calorimeter [Tm (° C.)]:

Using a differential scanning calorimeter (DSC7, manufactured by Perkin-Elmer Co.), 10 mg of a copolymer sample was first melted in a nitrogen atmosphere at 230° C. for 3 minutes, and then cooled to 40° C. at a cooling rate of 10° C./min. Then, the sample was kept at 40° C. for 3 minutes, and then heated at a heating rate of 10° C./min to obtain a melting endothermic curve of the sample. The peak top of the highest peak of the curve indicates the melting point (Tm) of the sample.

(5) Isotactic Triad Fraction in the PPP Chain Moiety of Copolymer as Measured in $^{13}$C—NMR [mm (mol %)]:

The isotactic triad fraction (mm) in the PPP chain moiety of the propylene-based copolymer of the invention indicates the isotactic fraction of the triad units in the PPP chain moiety of the copolymer molecular chains constituting the copolymer, and can be obtained from the $^{13}$C—NMR spectrum of the copolymer.

The fraction, mm, of a propylene homopolymer can be obtained from the following equation (a):

$$mm(\text{mol \%}) = [Imm/(Imm + Imr + Irr)] \times 100 \quad (a)$$

wherein Imm, Imr and Irr each indicate the peak strength in each of three methyl carbon regions, mm, mr and rr, respectively, in the $^{13}$C—NMR spectrum of the homopolymer sample. The mm region falls between 21.4 and 22.2 ppm of the chemical shift; the mr region falls between 20.6 and 21.4 ppm of the chemical shift; and the rr region falls between 19.8 and 20.6 ppm of the chemical shift.

On the other hand, in the $^{13}$C—NMR spectrum of a propylene-based random copolymer, the absorption position of the methyl carbon in the propylene unit (P) adjacent to the ethylene unit (E) is influenced by the ethylene unit. Concretely, the absorption peak derived from the methyl carbon of the propylene unit existing in the EPE chain moiety of the copolymer appears in the rr region, while the absorption peak derived from the methyl carbon of the propylene unit existing in the center of the PPE chain moiety of the copolymer appears in the mr region.

The absorption peak strength derived from the methyl carbon of the propylene unit existing in the EPE chain moiety corresponds to the peak strength for Tδδ (33.3 ppm). The absorption peak strength derived from the methyl carbon of the propylene unit existing in the center of the PPE chain moiety corresponds to the peak strength for Sαγ (38.0 ppm).

To obtain the isotactic triad fraction, mm, in the PPP chain moiety of the propylene-based random copolymer, used is the following equation (b):

$$mm(\text{mol \%}) = \{Imm/[(Imm + Imr - S\alpha\gamma) + (Irr - T\delta\delta)]\} \times 100 \quad (b)$$

The $^{13}$C—NMR spectrum of the copolymer sample was obtained, using an NMR device, JNM-EX400 Model (manufactured by Nippon Electronic Co.) under the condition mentioned below.

Sample concentration: 220 mg/3 ml of NMR solvent
  NMR solvent: 1,2,4-trichlorobenzene/heavy benzene (90/10, vol. %)
  Temperature: 130° C.
  Pulse: 45°
  Pulse frequency: 4 seconds
  Number of integration: 4000

(6) Time of Relaxation (τ):

Using a rotary rheometer (manufactured by Rheometrics Co.), a copolymer sample as put on a Cohn plate (diameter 25.0 mm; Cohn angle 0.10 radians) was subjected to frequency division at a temperature of 175° C. and at a frequency ($\omega_o = 10^0$ rad/sec). The time of relaxation of the sample τ (sec) was obtained as follows:

$$G^*(i\omega) = \sigma^*/\gamma^* = G'(\omega) + iG''(\omega)$$

where;
  $G^*(i\omega)$ indicates a complex modulus of elasticity of the sample, which is defined by $\sigma^*/\gamma^*$;
  $\sigma^*$ indicates the stress of the sample;
  $\gamma^*$ indicates the strain of the sample.
  $\tau(\omega) = G'(\omega)/\omega G''(\omega)$ where;
  ω indicates the frequency (rad/sec);
  $G'(\omega)$ indicates the stored modulus of elasticity;
  $G''(\omega)$ indicates the lost modulus of elasticity.

The primary foamability of resin beads and the secondary foamability and moldability of foaming beads were evaluated according to the methods mentioned below.

<Primary Foamability of Resin Beads>

(1) Foamability 1:

The temperature at which each sample of resin beads was foamed to have a predetermined bulk density of 0.045 g/cm$^3$ was measured. Relative to the standard sample of Comparative Example 1, each sample was evaluated for its foamability.

(2) Foamability 2:

Each sample of resin beads was foamed to have a predetermined bulk density of 0.045 g/cm$^3$. Relative to the standard sample of Comparative Example 1, each sample was evaluated for its cell uniformity. "⊚" indicates that the sample has better cell uniformity than the standard sample of Comparative Example 1; and "○" indicates that the cell uniformity of the sample was comparable to that of the standard sample of Comparative Example 1.

<Secondary Foamability and Moldability of Foaming Beads>

(1) Secondary Foamability:

Each sample of foaming beads was tested for its secondary foamability, and evaluated according to the criteria mentioned below.

○: The mold profile was transferred onto the surface of the cellular article sample tested, and the sample had few voids in its surface and inside. The sample is good in practical use.

X: The sample had many voids in its surface and inside. The sample is useless.

(2) Moldability:

The lowermost temperature at which a sample of foaming beads was moldable was measured according to the method mentioned below, and the sample was evaluated for its moldability.

Foaming beads having been prepared through primary foaming were charged into a mold having a size of 300×300×5 mm, and subjected to secondary foaming under a steam pressure falling between 2 and 4 kgG. The cellular articles thus produced were evaluated.

(3) Compression Characteristic:

The cellular articles produced in (2) were tested according to JIS K6767 to measure their compression hardness.

Examples 1 to 6

(1) Preparation of Magnesium Compound:

A reactor (inner volume: 500 liters) equipped with a stirrer was fully purged with nitrogen gas, into which were put 97.2 kg of ethanol, 640 g of iodine, and 6.4 kg of metal magnesium, and reacted with stirring under reflux until hydrogen gas was no more formed. Thus was formed a solid reaction product. The reaction mixture containing this solid product was dried under reduced pressure to obtain the intended magnesium compound (carrier of solid catalyst).

(2) Preparation of Solid Catalyst Component:

A reactor (inner volume: 500 liters) equipped with a stirrer was fully purged with nitrogen gas, into which were put 30 kg of the magnesium compound (not ground) prepared in (1), 150 liters of pure heptane (n-heptane), 4.5 liters of silicon tetrachloride, and 5.4 liters of di-n-butyl phthalate. The reaction system was kept at 90° C., into which was added 144 liters of titanium tetrachloride with stirring, and reacted at 110° C. for 2 hours. Next, the solid component was separated and washed with pure heptane at 80° C., to which was added 228 liters of titanium tetrachloride and reacted at 110° C. for2 hours. After having been fully washed with pure heptane, a solid catalyst component was obtained.

(3) Pre-treatment:

230 liters of pure heptane was put into a reactor (inner volume: 500 liters) equipped with a stirrer, into which were added 25 kg of the solid catalyst component prepared in (2), 1.0 mol/mol, relative to the titanium atom in the solid catalyst component, of triethyl aluminium, and 1.8 mols/mol, relative to the same, of dicyclopentyldimethoxysilane. Next, propylene was introduced into the reactor to have a propylene partial pressure of 0.3 kg/cm$^2$G, and reacted at 25° C. for 4 hours. After the reaction, the solid catalyst component was washed several times with pure heptane, and then processed with carbon dioxide for 24 hours with stirring.

(4) Polymerization:

Into a polymerization reactor (inner volume: 200 liters) equipped with a stirrer, fed was the pre-treated solid catalyst component prepared in (3), at a rate of 3 mmols/hr in terms of the titanium atom in the component, along with 4 mmols/kg-PP of triethyl aluminium and 1 mmol/kg-PP of dicyclopentyldimethoxysilane, and propylene and ethylene were fed thereinto and copolymerized at a polymerization temperature of 80° C. and under a polymerization pressure (total pressure) of 28 kg/cm$^2$G. In this copolymerization, the ethylene concentration and the hydrogen concentration in the reactor were controlled to be predetermined ones, thereby making the copolymer have a desired ethylene unit content and a desired molecular weight.

The physical properties of the propylene-ethylene random copolymers obtained are shown in Table 1, along with the composition of the vapor atmosphere for polymerization.

(5) Foaming:

To 100 parts by weight of the propylene-ethylene random copolymer produced in (4), added were 0.1 parts by weight an antioxidant (Irganox 1010, manufactured by Ciba-Geigy Co.) and 0.05 parts by weight of talc, and the resulting mixture was extruded through a 90-mmφ single-screw extruder to prepare resin beads having a diameter of 1 mm and a length of 3 mm.

Next, 300 parts by weight of water, 1 part by weight of a dispersant, fine particulate aluminium oxide, and 100 parts by weight of the resin beads prepared above were put into a one-liter closed container equipped with a stirrer, and heated at a temperature falling between 125 and 160° C. with stirring, and 20 parts by weight of dichlorodifluoromethane was added thereto. Then, this was kept pressured with nitrogen of 40 kg/cm$^2$G for 20 minutes, and, while being still pressured under the same pressure, one end of the container was opened through which the resin beads and water were discharged into an atmospheric space for primary foaming to prepare foaming beads. In this step, the primary foaming beads prepared were made to have a bulk density of 0.045 g/cm$^3$. The foamability of the resin beads in the primary foaming is shown in Table 2.

Next, the thus-prepared foaming beads were kept pressured in air under 1.5 kg/cm$^2$G, charged into a mold having a size of 300×300×50 mm, and foamed therein for secondary foaming under a steam pressure of from 2.0 to 4.0 kg/cm$^2$G. Thus was produced a cellular body. The foamability and the moldability of the foaming beads in the secondary foaming are shown in Table 2.

Comparative Examples 1 and 2

Using a conventional TiCl$_3$-based catalyst, a propylene-ethylene random copolymer was produced through slurry polymerization at 60° C. The physical properties of the copolymer are shown in Table 1.

Next, in the same manner as in the previous Example, the copolymer was processed to prepare foaming beads, which were then foamed and molded into cellular bodies. The foamability of the resin beads in the primary foaming, and also the foamability and the moldability of the foaming beads in these Comparative Examples are shown in Table 2.

Comparative Example 3

Using a conventional TiCl3-based catalyst, a propylene-ethylene-butene-1 random copolymer was produced through vapor-phase polymerization at 70° C. The physical properties of the copolymer are shown in Table 1.

Next, in the same manner as in the previous Example, the copolymer was processed to prepare foaming beads, which were then foamed and molded into a cellular body. The foamability of the resin beads in the primary foaming, and also the foamability and the moldability of the foaming beads in this Comparative Example are shown in Table 2.

TABLE 1

|  |  | Example | | | |
|---|---|---|---|---|---|
|  |  | 1 | 2 | 3 | 4 |
| Composition of Vapor Atmosphere for Polymerization[1]) | Hydrogen (mol %) | 4.0 | 4.4 | 3.8 | 4.0 |
|  | Ethylene (mol %) | 1.2 | 1.2 | 2.6 | 2.2 |
|  | Butene-1 (mol %) | — | — | — | — |
| Comonomer Unit Content | Ethylene Unit (wt. %) | 2.1 | 1.8 | 3.0 | 2.8 |
|  | Butene-1 Unit (wt. %) | — | — | — | — |
| Melt Index [MI] (g/10 min) | | 9.0 | 11.4 | 4.4 | 7.1 |
| Boiling Diethyl Ether Extraction (wt. %) | | 1.0 | 1.1 | 1.6 | 1.6 |
| Melting Point [Tm] (° C.) | | 151 | 150 | 142 | 144 |
| Isotactic Triad Fraction (mol %) | | 99.5 | 99.5 | 99.3 | 99.4 |
| Time of Relaxation, τ (sec) | | 0.37 | 0.32 | 0.48 | 0.41 |

[1])Composition of Vapor Atmosphere for Polymerization: Analyzed through gas chromatography.

TABLE 1-2

|  |  | Example | | Comparative Example | | |
|---|---|---|---|---|---|---|
|  |  | 5 | 6 | 1 | 2 | 3 |
| Composition of Vapor Atmosphere for Polymerization[1]) | Hydrogen (mol %) | 3.3 | 5.5 | 5.0 | 7.5 | 2.5 |
|  | Ethylene (mol %) | 2.2 | 2.4 | 2.5 | 5.0 | 0.25 |
|  | Butene-1 (mol %) | — | — | — | — | 3.9 |
| Comonomer Unit Content | Ethylene Unit (wt. %) | 3.1 | 4.4 | 2.5 | 4.5 | 0.5 |
|  | Butene-1 Unit (wt. %) | — | — | — | — | 3.7 |
| Melt Index [MI] (g/10 min) | | 10.0 | 5.5 | 10.5 | 6.9 | 11.1 |
| Boiling Diethyl Ether Extraction (wt. %) | | 1.3 | 2.1 | 1.5 | 3.6 | 1.5 |
| Melting Point [Tm] (° C.) | | 142 | 136 | 145 | 133 | 148 |
| Isotactic Triad Fraction (mol %) | | 99.3 | 99.2 | 97.0 | 95.0 | — |
| Time of Relaxation, τ (sec) | | 0.34 | 0.41 | 0.48 | 0.45 | 0.46 |

[1])Composition of Vapor Atmosphere for Polymerization: Analyzed through gas chromatography.

TABLE 2

|  | Foamability of Resin Beads in Primary Foaming | | | Foamability and Moldability of Foaming Beads in Secondary Foaming | |
|---|---|---|---|---|---|
|  | Foamability 1 Foaming Temperature (° C.) | Foamability 2 | Foamability | Moldability Foaming Temperature (° C.) | Compression Characteristic Hardness (%) |
| Example 1 | +2 | ⊚ | ○ | +2 | +20 |
| Example 2 | +3 | ⊚ | ○ | +2 | +30 |
| Example 3 | −5 | ⊚ | ○ | −4 | 0 |
| Example 4 | −4 | ⊚ | ○ | −4 | +10 |
| Example 5 | −5 | ⊚ | ○ | −5 | 0 |
| Example 6 | −7 | ⊚ | ○ | −7 | −10 |
| Comparative Example 1 | 0* | ○* | ○* | 0* | 0* |
| Comparative Example 2 | −7 | ○ | ○ | −7 | −30 |
| Comparative Example 3 | +4 | ○ | ○ | +4 | +20 |

*)Data of the standard sample.

INDUSTRIAL APPLICABILITY

The foaming propylene-based copolymer of the invention is a propylene-ethylene random copolymer having a high degree of isotacticity, and its primary and secondary foamability is good to give cellular articles having excellent mechanical properties including rigidity. When compared with conventional crystalline propylene-based copolymers, the copolymer of the invention can be subjected to primary and secondary foaming at lower temperatures, and has the advantage of good industrial applicability.

The cellular articles of the invention are favorably used, for example, in buffer materials, wrapping materials, bumper core materials, floating materials, heat-insulating materials, etc.

What is claimed is:

1. A foamable propylene-based copolymer of a propylene-ethylene random copolymer, having:
   (1) an ethylene unit content (x (wt. %)) of between 0.2 and 10% by weight,
   (2) a melt index (MI (at 230° C. under a load of 2160 g)) of between 1 and 16 g/10 min,
   (3) a boiling diethyl ether extraction (E (wt. %)) and x satisfying the formula (I):

$$E \leq 0.25x + 1.1 \tag{I},$$

(4) a melting point (Tm (° C.)) as measured through differential scanning calorimetry and x satisfying the formula (II):

$$Tm \leq 165 - 5x \tag{II},$$

and
   (5) an isotactic triad fraction in the PPP chain moiety as measured through $^{13}$C—NMR of not smaller than 98 mol %.

2. The foamable propylene-based copolymer of claim 1, having an ethylene unit content is between 0.3 and 0.8% by weight.

3. The foamable propylene-based copolymers of claim 1, having a melt index (MI) is in a range of 4.4 to 11.4.

4. The foamable propylene-based copolymer of claim 1, having a boiling diethyl ether extraction in wt. % in a range of 1.0 to 2.1.

5. The foamable propylene-based copolymer of claim 1, having a melting point in a range of 136 to 151° C.

6. The foamable propylene-based copolymer of claim 1, having an isotactic triad fraction in mol % in a range of 99.3 to 99.5.

7. The foamable propylene-based copolymer of claim 1, having a time of relaxation of τ of 0.32 to 0.48 sec.

8. Foamable beads, comprising the propylene-based copolymer of claim 1.

9. A foamable propylene-based copolymer of a propylene-ethylene random copolymer, having:

(1) an ethylene unit content (x 9 wt. %)) of between 0.2 and 10% by weight, (2) a melt index (MI (at 230° C. under a load of 2160 g)) of between 1 and 15 g/10 min, (3) a boiling diethyl ether extraction (E (wt. %)) and x satisfying the formula (1):

$$E \leq 0.25x+1.1 \quad (I),$$

(4) a melting point (Tm (° C.)) as measured through differential scanning calorimetry and x satisfying formula (II):

$$Tm \leq 165-5x \quad (II),$$

(5) an isotactic triad fraction in the PPP chain moiety as measured through $^{13}$C—NMR of not smaller than 98 mol %, and (6) a relation between the time of relaxation τ (sec) of the copolymer as obtained through frequency division measurement at a frequency $\omega_o = 10^0$ rad/sec and MI of the copolymer satisfying the formula (III):

$$\tau \leq 0.80 - 0.42x \log MI \quad (III).$$

10. Foamable beads, comprising the propylene-based copolymer of claim 9.

11. A cellular article produced by foaming the beads of claim 10.

12. The cellular article of claim 11, which is a buffer material.

13. The cellular article of claim 11, which is a wrapping material.

14. The cellular article of claim 11, which is a bumper core material.

15. The cellular article of claim 11, which is a floating material.

16. The cellular article of claim 11, which is a heat-insulating material.

* * * * *